(12) United States Patent
Birman et al.

(10) Patent No.: US 7,591,562 B2
(45) Date of Patent: Sep. 22, 2009

(54) POINTER LIGHT HOUSING

(75) Inventors: Vyacheslav Birman, Rochester Hills, MI (US); Richard Sanders, Clarkston, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 714 days.

(21) Appl. No.: 11/133,668

(22) Filed: May 20, 2005

(65) Prior Publication Data
US 2005/0281018 A1 Dec. 22, 2005

Related U.S. Application Data

(60) Provisional application No. 60/581,174, filed on Jun. 16, 2004.

(51) Int. Cl.
*G01D 11/28* (2006.01)
(52) U.S. Cl. ............... 362/23; 362/28; 362/29; 362/30
(58) Field of Classification Search ........... 362/489, 362/23, 27–30, 800; 116/47–79, 62.1, 62.4
See application file for complete search history.

(56) References Cited

U.S. PATENT DOCUMENTS

| | | | | |
|---|---|---|---|---|
| 1,956,092 | A * | 4/1934 | Ewald | ............ 362/23 |
| 2,585,565 | A * | 2/1952 | Luck | ............ 340/870.41 |
| 5,703,612 | A * | 12/1997 | Salmon et al. | ......... 340/815.78 |
| 6,595,667 | B1 | 7/2003 | Obata | |
| 6,959,995 | B2 * | 11/2005 | Ikarashi et al. | ............... 362/23 |
| 6,981,464 | B2 * | 1/2006 | Birman et al. | ............. 116/288 |
| 2002/0001183 | A1 | 1/2002 | Shigehiro | |
| 2002/0135994 | A1 * | 9/2002 | Ikarashi et al. | ............... 362/23 |
| 2006/0238993 | A1 * | 10/2006 | Obata et al. | ............... 362/23 |

FOREIGN PATENT DOCUMENTS

| | | |
|---|---|---|
| GB | 271766 | 6/1927 |
| GB | 523215 | 7/1940 |
| JP | 2002231011 | 8/2002 |

OTHER PUBLICATIONS

International Search Report dated Nov. 3, 2005.

* cited by examiner

*Primary Examiner*—Jacob Y Choi

(57) ABSTRACT

A light housing for an instrument panel includes an interior surface for reflecting and blending light from a plurality of light sources substantially uniformly from an opening. The light housing is mounted to a circuit board and surrounds a plurality of light sources. An interior surface of the light housing includes inwardly protruding ribs that reflect and direct light to blend the separate light sources and provide a substantially uniform light intensity for illuminating a rotating pointer.

20 Claims, 3 Drawing Sheets

US 7,591,562 B2

POINTER LIGHT HOUSING

CROSS REFERENCE TO RELATED APPLICATION

The application claims priority to U.S. Provisional Application No. 60/581,174 which was filed on Jun. 16, 2004.

BACKGROUND OF THE INVENTION

The invention relates to an illuminated pointer for a vehicle instrument panel. More particularly, this invention relates to an improved light housing for uniformly illuminating a pointer.

A vehicle instrument panel typically includes a rotating pointer that points to a graphical image imprinted on a gage surface. It is known to illuminate the pointer by directing light though the gage surface onto reflective surfaces of the pointer. A known device directs light through a transparent shaft to the pointer. The pointer includes reflective surfaces that transmit light through the pointer. However, in many instances it is not possible or feasible to provide a transparent shaft. Accordingly, many known pointers are supported on a non-transparent shaft. Light is provided to illuminate the pointer by positioning lights around the shaft to transmit light to corresponding reflective surfaces of the pointer.

Disadvantageously, lights that surround a non-translucent shaft are spaced apart from the axis of rotation. Therefore, rotation of the pointer changes the relative position between the pointer and the light source. This can cause an uneven distribution of light within the pointer that can very with the relative position of the pointer.

Accordingly, it is desirable to develop and design a device for illuminating a pointer supported on a non-translucent shaft that provides substantially uniform lighting for all positions of the pointer.

SUMMARY OF THE INVENTION

This invention is a light housing with light blending surfaces for distributing light from a plurality of light sources uniformly onto an illuminated pointer for an instrument panel.

An example light housing according to this invention includes an inner surface with a plurality of ribs. The ribs protrude inwardly from the inner surface of the light housing to reflect and blend light from several light sources. The ribs provide for a blending of light emitted from the several light sources such that light reflected onto the pointer assembly is substantially uniform regardless of radial position. The pointer includes at least one reflective surface that is offset from the axis of rotation. The offset position of the reflective surface causes a change in relative position between the light sources and the reflective surface as the pointer rotates.

The ribs blend light emitted from the several light sources such that light emitted through an opening in the light housing is of a substantially uniform intensity for all radial positions of the pointer. The substantially uniform or blended light emitted from the light housing provides a uniform illumination of the pointer regardless of the position of the pointer relative to the several light sources.

Accordingly, the light housing of this invention provides substantially uniform illumination of a pointer having reflective surfaces offset from an axis of rotation.

These and other features of the present invention can be best understood from the following specification and drawings, the following of which is a brief description.

DETAILED DESCRIPTION OF THE PREFERRED EMBODIMENT

Figure 1:
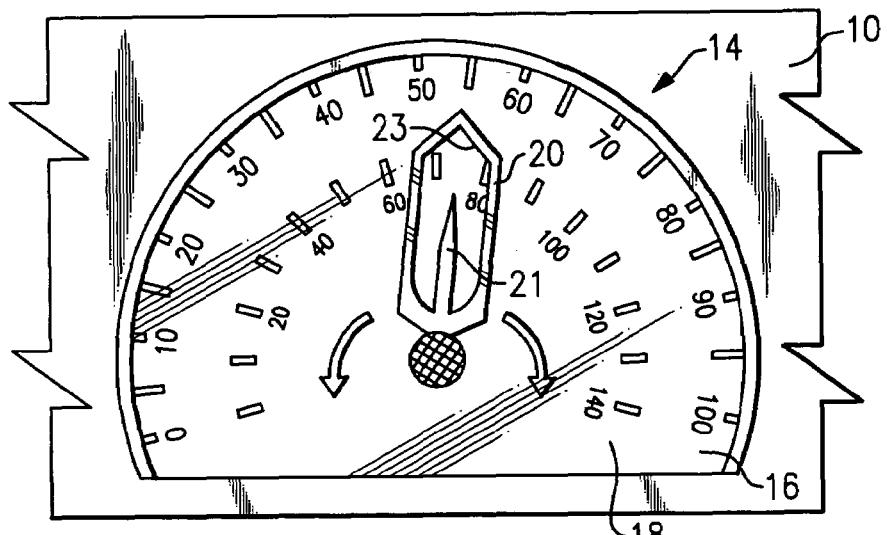
FIG. 1 is a plan view of an instrument panel.

Referring to FIG. 1, an instrument panel assembly 10 includes a display surface 12 that includes a graphical display 14 such as a speedometer as is illustrated. The graphical display 14 includes a first scale 16 that indicates miles per hour and a second scale 18 that indicates kilometers per hour. A pointer 20 including an inside pointer 21 and an outer pointer 23 and rotates relative to the graphical display 14 to communicate information to a vehicle operator. The pointer 20 is illuminated to provide a desirable contrast to the graphical display 14. Illumination for the pointer 20 originates from light sources disposed below the display surface 12.

Figure 2:
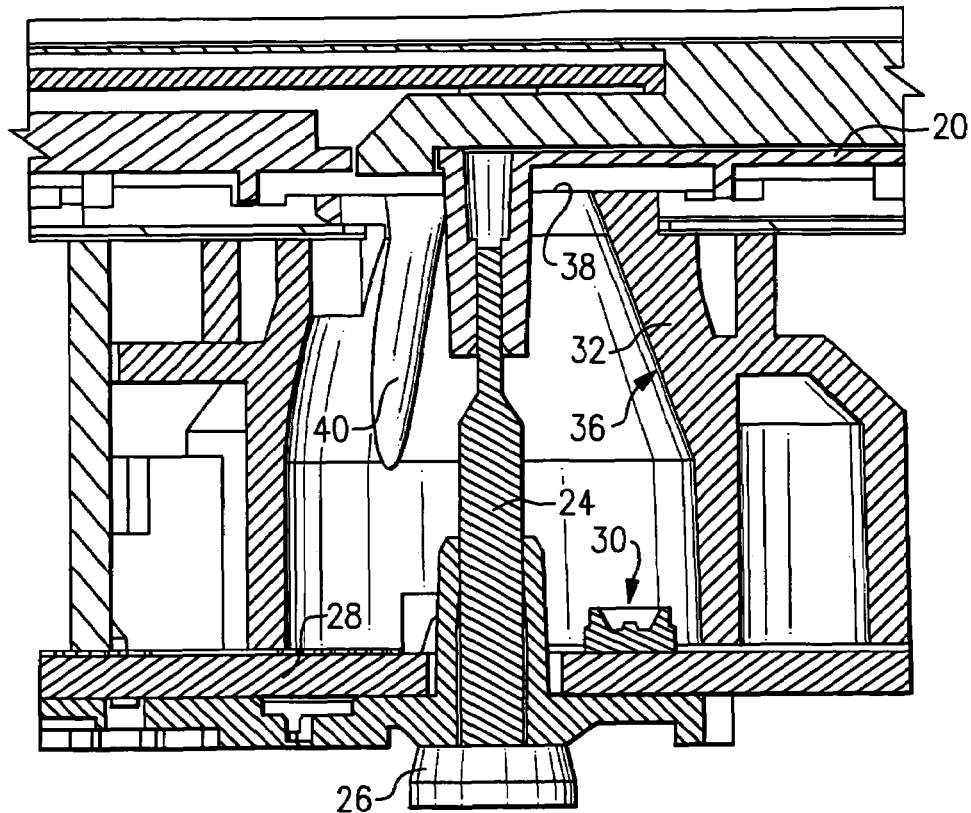
FIG. 2 is a cross-sectional view of an example light housing according to this invention.

Referring to FIG. 2, the instrument panel assembly 10 includes a circuit board 28 to which a plurality of light emitting diodes (LED) 30 are mounted. The LEDs 30 emit light from within a light housing 32 through an opening 38 and onto reflective surfaces 22 of the pointer 20. The pointer 20 is mounted to a non-translucent shaft 24 that is in turn mounted and rotated by a stepper motor 26. Because the shaft 24 is non-translucent light for illuminating the pointer 20 cannot be transmitted through an axis of rotation 15 of the pointer 20. Accordingly, rotation of the pointer 20 changes the relative position of the reflective surfaces 22 (FIG. 3) to the LEDs 30. Changes in relative position can result in an inconsistent illumination depending on the proximity of the reflective surfaces to the position of the LEDs 30. The light housing 32 of this invention includes a plurality of light blending surfaces for uniformly distributing light onto the pointer 20. The light blending surfaces shown in the example light housing 32 include a plurality of ribs 40 that receive and reflect light from the LEDs 30 to blend light into a consistent intensity.

The light housing 32 includes an inner surface 36 that is somewhat conically shaped such that the inner surface 36 gradually inclines inwardly on itself. The inner surface 36 include the ribs 40 that begin at an opening 38 and extend downwardly. The LEDs 30 are mounted to the circuit board 28 and spaced evenly radially about the shaft 24. Further, each of the LEDs 30 are disposed and mounted to the circuit board 28 proximate one of the ribs 40. That is the LEDs 30 are spaced radially about the shaft 24 in a corresponding manner with the ribs 40. Each rib 40 is a semi-circular protrusion from the inner surface 36 of the light housing 32. Light emitted from the LEDs 30 reflect and are received by the ribs 40 and blended with light emitted from each of the other LEDs 30 and emitted through the opening 38 to provide a substantially even and uniform light intensity about the shaft 24.

Figure 3:
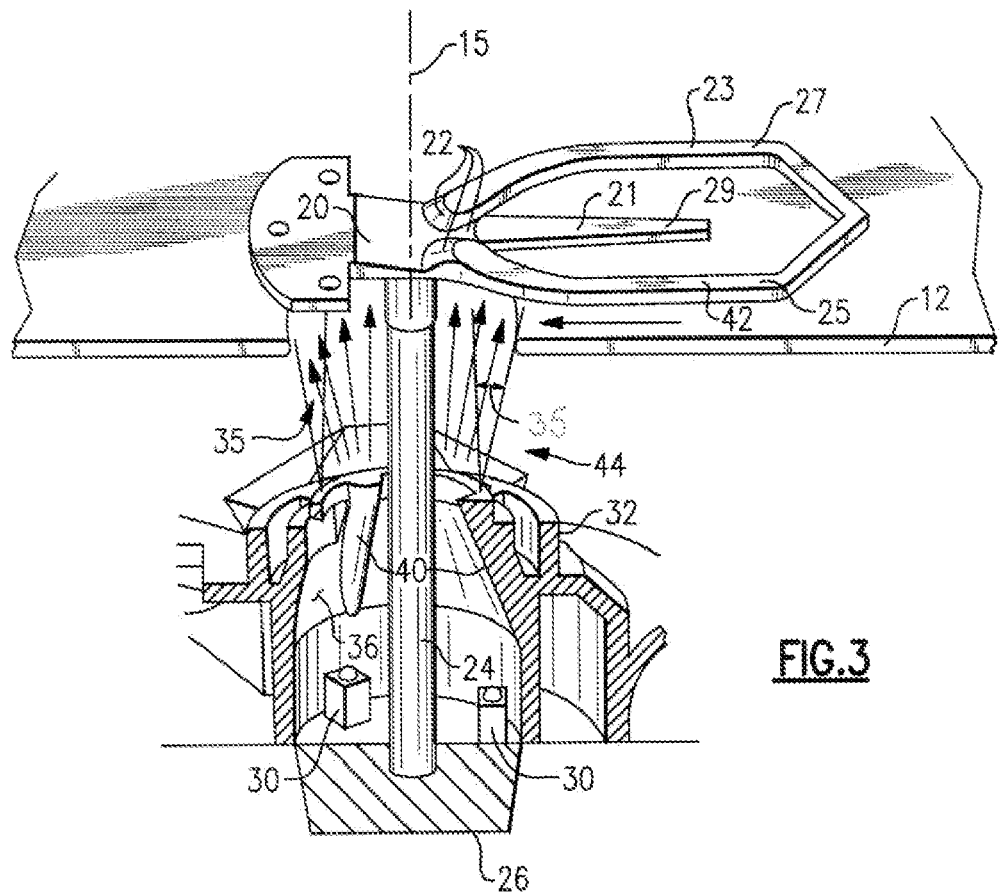
FIG. 3 is a schematic view of a pointer assembly and the example light housing according to this invention.

Referring to FIG. 3, a schematic diagram of the light housing 32 is shown and includes the ribs 40. Light emitted from the LEDs 30 is focused upwardly onto the pointer 20. Light emitted from the LEDs 30 is generally indicated at 42 and is emitted about the shaft 24 in rays distributed in a cone shaped light field 44 directed toward the pointer 20. The light ray cone is emitted at an angle 35 measured from normal with the circuit board 28. The cone of light 42 is emitted in a frustum shaped field indicated at 44 having a substantially uniform light intensity. In the cone shaped field 44, light intensity is substantially uniform such that regardless of what rotational position that the pointer 20, the light intensity is substantially the same. The cone shaped light field 44 projects outwardly at the angle 35 that is approximately 10 degrees from normal to the circuit board 28. Although 10 degrees is shown, other angles and shapes of the light emitted from the light housing 32 are within the contemplation of this invention.

The pointer 20 includes reflective surfaces 22 for receiving and directing light through the pointer 20. The pointer 20 illustrated includes three different leg portions 25, 27, and 29 that form the inner pointer 21 and the outer pointer 23. The leg portions 25,27,29 each include a separate reflective surface 22. The separate reflective surfaces 22 receive light depending on the rotation position of the pointer 20. Because the ribs 40 blend light emitted from the LEDs 30, light is received at each of the reflective surfaces 22 at substantially the same intensity thereby providing a substantially uniform illumination of the pointer 20 regardless of radial position. Although, the example pointer 20 illustrated includes three legs and an inside pointer and an outside pointer, other known pointer configurations are also within the contemplation of this invention and would benefit from the application of the inventive light housing 32.

Figure 5:
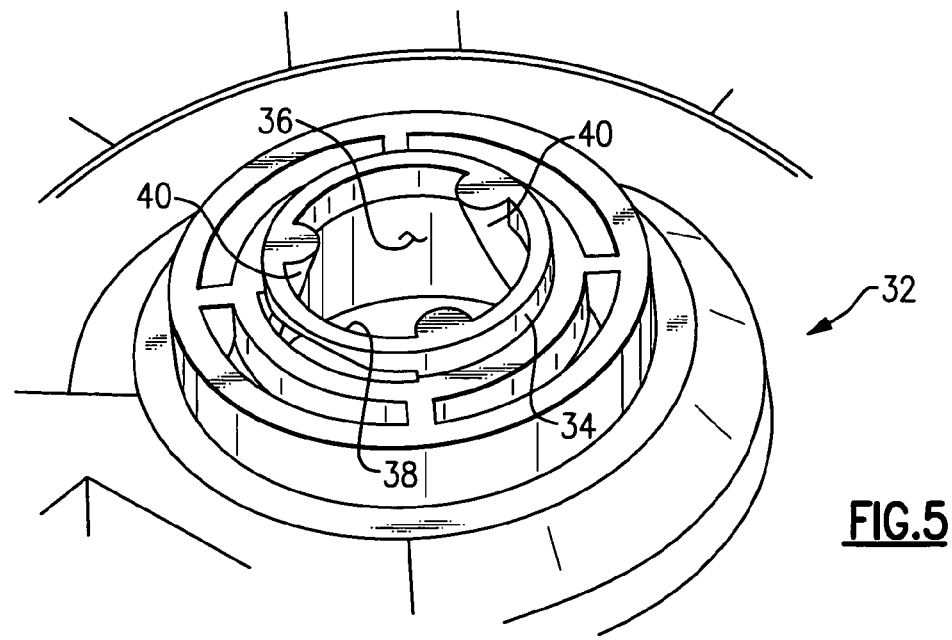
FIG. 5 is a perspective view of the example light housing according to this invention.
Figure 4:
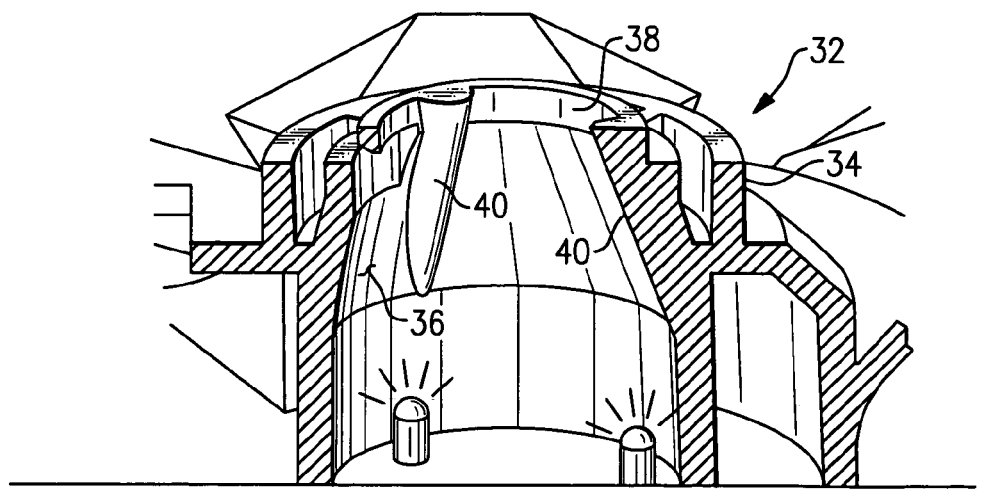
FIG. 4 is a cross-sectional view of the example light housing according to this invention.

Referring to FIGS. 4 and 5, the light housing 32 is shown with many parts removed to better show the structure. The light housing 32 includes an outer surface 34 that is coated with a non-translucent material to block light transmission therethrough. The interior surface 36 includes the three radially separated ribs 40. The inner surface 36 slopes inwardly such that the opening 38 is smaller than the widest portion of the interior portion of the light housing. The light housing 32 includes external features that aid in mounting to and within the instrument panel assembly 10. The outer surface can be of any configuration that would be desired to enable and fit within known instrument panel assemblies.

Figure 6:
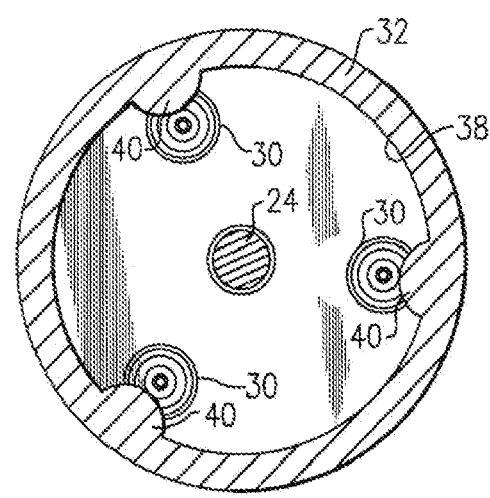
FIG. 6 is a top view through an opening of an example light housing according to this invention.

Referring to FIG. 6, three LEDs 30 are positioned adjacent each rib 40 to provide the desired reflection and blending of light. The LEDs 30 are partially covered by the ribs 40 and light housing 32 when viewing from a downward angle. The inward sloping interior surface 36 reflects and focuses light onto the receiver portions of the pointer 20. As appreciated, the number of ribs 40 and LEDs 30 may vary within the contemplation of this invention.

Accordingly, the light housing of this invention includes rib features to reflect and blend light to provide a uniform luminance that is projected onto a pointer assembly to provide substantially uniform illumination for the pointer 20 regardless of radial position.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An instrument panel assembly comprising:
   a display surface including a graphical display;
   a pointer supported by a rotatable shaft extending through said display surface and movable relative to said display surface;
   at least one light source for emitting light onto said pointer, and
   a light housing surrounding said at least one light source for focusing emitted light toward said pointer, said light housing including an inner surface and a plurality of light blending surfaces spaced circumferentially apart for dispersing the emitted light uniformly onto said pointer.

2. The assembly as recited in claim 1, wherein said light blending surfaces comprise a plurality of ribs disposed longitudinally on said inner surface of said light housing.

3. The assembly as recited in claim 2, including a corresponding plurality of light sources corresponding to said plurality of ribs.

4. The assembly as recited in claim 1, wherein said rotatable shaft is non-translucent.

5. The assembly as recited in claim 1, wherein said at least one light source is mounted to a circuit board disposed below said display surface and said light housing is mounted to said circuit board surrounding said light source.

6. The assembly as recited in claim 5, wherein said light housing defines an opening for directing light onto said pointer.

7. The assembly as recited in claim 1, wherein said light housing includes an outer surface covered at least partially with a reflective coating.

8. The assembly as recited in claim 1, wherein said light housing focuses light emitted from said at least one light source within a cone having a decreasing cross-sectional area toward said pointer.

9. The assembly as recited in claim 8, wherein said cone comprises a substantially uniform light intensity between said light housing and said pointer.

10. The assembly as recited in claim 1, wherein said pointer includes a light-reflecting surface spaced apart from an axis of rotation.

11. The assembly as recited in claim 10, wherein said pointer includes a first pointer having a first leg and a second leg, and a second pointer extending between said first and second legs.

12. The assembly as recited in claim 11, wherein said light-reflecting surface directs light emitted from below said pointer assembly through each of said first pointer and said second pointer.

13. An instrument panel pointer assembly comprising:
   a pointer supported on a rotatable shaft;
   a plurality of light sources supported below said pointer,
   a light housing surrounding said plurality of light sources and including an outer surface at least partially comprising an anti-reflective portion and an inner surface comprising a plurality of light blending surfaces spaced circumferentially apart and protruding radially inward for uniformly distributing light emitted from said plurality of light sources through an opening of said light housing toward said pointer.

14. The assembly as recited in claim 13, wherein said plurality of light blending surfaces are evenly spaced about said inner surface of said light housing.

15. The assembly as recited in claim 14, wherein said plurality of light sources comprises three light sources and said plurality of light blending surfaces comprises three light blending surfaces spaced equal distances apart and proximate one of said three light sources.

16. The assembly as recited in claim 13, wherein each of said plurality of light blending surfaces comprises a semi-spherical profile protruding from said inner surface of said light housing.

17. The assembly as recited in claim 13, wherein each of said plurality of light blending surfaces extend longitudinally downward from said opening of said light housing.

18. An instrument panel assembly comprising:
a pointer rotatable about a central axis;
at least two light sources supported about said central axis for emitting light into said pointer; and
a light housing surrounding said at least two light sources for focusing light emitted from said at least two light sources toward said pointer, wherein an inner surface of said light housing includes at least two ribs extending vertically along said inner surface that each correspond with one of said at least two light sources.

19. The assembly as recited in claim 18, wherein said at least two ribs are spaced circumferentially a part.

20. The assembly as recited in claim 18, wherein each of said at least two ribs project radially inward from said inner surface.

\* \* \* \* \*